United States Patent [19]

Hamilton et al.

[11] Patent Number: 4,793,468
[45] Date of Patent: Dec. 27, 1988

[54] MULTIPHASE SLIDING FLOOR FOR CONTINUOUS MATERIAL MOVEMENT

[75] Inventors: James M. Hamilton, El Cajon; Phillip J. Sweet, Fresno, both of Calif.

[73] Assignees: Western Waste Industries et al., Gardena; American Carrier Equipment Incorporated, Fresno, both of Calif.

[21] Appl. No.: 926,366

[22] Filed: Oct. 31, 1986

[51] Int. Cl.4 .............................................. B65G 25/04
[52] U.S. Cl. ................................ 198/750; 414/525.9; 91/530
[58] Field of Search ............... 198/750, 773, 774, 775; 414/525 R; 91/508, 519, 170 R, 530, 531

[56] References Cited

U.S. PATENT DOCUMENTS

| | | | |
|---|---|---|---|
| 3,534,875 | 10/1970 | Hallstrom | 198/750 X |
| 4,143,760 | 3/1979 | Hallstrom | 198/750 |
| 4,144,963 | 3/1979 | Hallstrom | 198/750 |
| 4,184,587 | 1/1980 | Hallstrom | 198/750 |
| 4,474,285 | 10/1984 | Foster | 198/750 |
| 4,580,678 | 4/1986 | Foster | 198/775 X |

Primary Examiner—Robert J. Spar
Assistant Examiner—D. Glenn Dayoan
Attorney, Agent, or Firm—Noel F. Heal

[57] ABSTRACT

Apparatus, and a related method, for controlling a moving floor having multiple sliding slats, to produce a practically continuous load-moving force on a load carried on the apparatus. The slats are reciprocated back and forth by hydraulic cylinders, each of which controls a group of slats that are moved together. At any given time, a majority of slats are moving together in the desired direction, and carry a load in this direction at a nearly uniform velocity. The remainder of the slats are moved in a reverse direction, but at a speed that is a multiple of the forward speed of the majority of the slats. Each group of slats is moved through a forward stroke at a relatively low speed; then through a backward stroke at a higher speed.

24 Claims, 7 Drawing Sheets

MULTIPHASE SLIDING FLOOR FOR CONTINUOUS MATERIAL MOVEMENT

BACKGROUND OF THE INVENTION

This invention relates generally to techniques for moving a heavy load by moving a supporting floor beneath the load and, more particularly, to techniques for moving a heavy load supported on a floor consisting of multiple movable stairs. If, for example, all of the slats are moved together in one direction, the load will be carried in that direction, but if the slats are returned to their starting positions in smaller groups containing only a fraction of the total number of slats, then the frictional forces between the load and a returning group of slats will be insufficient to move the load in the reverse direction.

Moving floors of this type have a number of useful applications, one of which is in the collection and disposal of garbage or waste. In large cities, long distances to disposal sites have resulted in the increased use of large transfer trailers, for the temporary storage of waste gathered by collection vehicles. When a transfer trailer is full, it is towed to a disposal site for emptying. Emptying such a vehicle by tipping is cumbersome and difficult if a large trailer is used, movable floors provide an ideal solution. Typically, a rear door of the trailer is opened and the waste material is ejected through the door by operation of the moving floor.

Systems in use prior to the present invention are sometimes referred to as "walking" floors and operate by moving all of the slats in the desired direction as far as they can travel, and then returning each slat one at a time. These systems incorporate relatively simple hydraulic control techniques and, when a hydraulic cylinder reaches the limit of its travel, the fluid flow from a hydraulic pump must be bypassed to a holding tank until valves can switch the cylinder in the appropriate direction. The time required for unloading with these systems is typically 15-20 minutes, which is considerably longer than desired.

The principal disadvantage of prior systems of this general type is that the load movement is started and stopped repeatedly, which is clearly inefficient and time consuming. The time to unload is at least twice as long as it would be if the load could move continuously. In addition there are hydraulic control system disadvantages, in that the oil tends to overheat due to the need for bypassing the pump at the end of all of the strokes before the hydraulic cylinders can switch. Moreover, rather large pump flow rates are required to gain reasonable speeds. The present invention overcomes all of these disadvantages.

It will be appreciated there is a need for improvement in the field of movable floors. In particular, there is a need for a movable or walking floor that operates in a more continuous and efficient manner. The present invention fulfills this need and has other advantages that will become apparent from the following summary.

SUMMARY OF THE INVENTION

The present invention resides in a "sliding" floor than can move a load at the maximum possible speed, with the fewest number of components and without any overheating of the oil in the system during prolonged operation. The invention accomplishes these goals in a novel yet simple and reliable manner, by combining a hydraulic subsystem, including hydraulic cylinders, a pump, and control valves, with an electronic controller. The hydraulic subsystem accomplishes the desired objectives by operating a moving floor in which a majority of the slats are always moving in the desired direction of load movement.

Briefly, and in general terms, the apparatus of the invention includes a plurality of elongated floor slats movable in a direction parallel to the slats, and means for moving the slats in a reciprocating manner such that, at any instant during operation of the system, a majority of the slats are moving in the desired direction at a predetermined speed, and a minority of the slats are moving in the opposite direction at a higher speed. The load supported by the floor will tend to move in the direction of the majority of slower moving slats.

In the illustrative embodiment of the invention, the slats are arranged in groups, the positions of which are staggered when the apparatus is in operation, such that each time one group reaches its maximum extension, the group that had previously reached its maximum extension reaches its minimum extension, having been moved more rapidly in the reverse direction, and can be switched to the forward direction at the same time that the group at its furthest extension is to be reversed. Each of the other groups of slats is staggered behind the furthest slat and subsequently, in sequence, each reaches its maximum extension at the same time that the previously reversed slat has reached its minimum extension. When this operation is repeated cylically, the result is a sliding floor that moves the load continuously and efficiently.

In the preferred embodiment of the invention, only one gropu of slats is moved in the reverse direction at any time, the remaining majority of slats being moved in the desired forward direction. The timing relationships that make this arrangement possible are achieved by employing hydraulic cylinders to move the groups of slats, and connecting the cylinders in such a manner that the hydraulic fluid that drives the majority of cylinders in the desired direction also passes through the one cylinder used to drive one cylinder in the reverse direction. Therefore, if there are N cylinders, the reversing cylinder will receive hydraulic fluid at (N−1) times the rate of the other cylinders, and will move at a correspondingly higher speed in the reverse direction.

In accordance with other aspects of the invention, the direction of movement of the load can be reversed, and the speeds of the majority of cylinders moving in the desired direction can be equalized as closely as possible.

It will be appreciated from the foregoing that the present invention represents a significant advance in the field of moving floors for the movement of loads, such as from a truck bed. In particular, the invention provides a moving floor that provides continuous movement to the supported load, and avoids overheating and other mechanical problems of the prior art. Moreover, the moving floor of the invention provides a more rapid speed of load movement than the discontinuous systems of the prior art. Other aspects and advantages of the invention will become apparent from the following more detailed description, taken in conjunction within the accompanying drawings.

BRIEF DESCRIPTION OF THE DRAWINGS

FIG. 4c is a valve timing diagram similar to FIG. 4a, but showing operation with a flow splitter included, as in FIG. 2a;

DESCRIPTION OF PREFERRED EMBODIMENTS

As shown in the drawings for purposes of illustration, the present invention is concerned with an improved movable floor for moving loads, such as waste from a vehicle. Prior movable floors have operating by translating all of a plurality of slats in one direction at the same time, and then returning the slats to their starting position one at a time. This resulted in intermittent load movement and related difficulties with hydraulic subsystems.

In accordance with the present invention, a load is moved on a movable floor in a practically continuous manner, since the majority of the slats are always moving in a desired direction. This continuity of operation provides a much more efficient and rapid load movement and also results in a more efficient hydraulic subsystem design.

Figure 1:
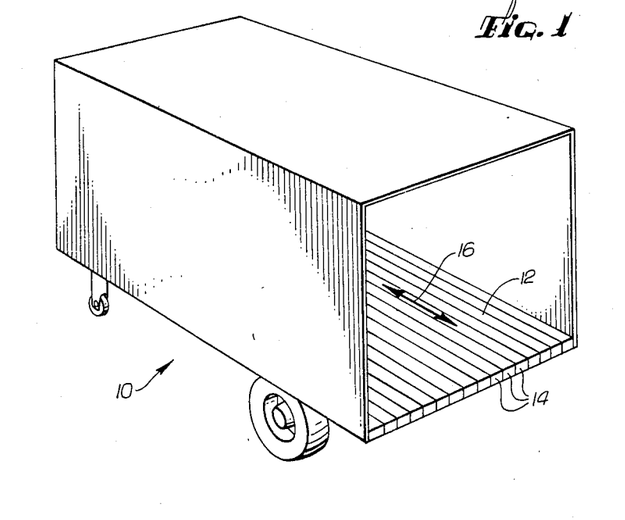
FIG. 1 is a simplified isometric view of a transfer trailer of the type with which the present invention is concerned.

As shown in FIG. 1, a trailer, indicated by reference numeral 10, has a hydraulic subsystem mounted under the trailer, with a pump mounted on a tractor (not shown) and powered by the tractor's engine. The trailer 10 has a floor 12 comprising a number of movable slats 14 that are mounted for sliding movement in a forward and rearward direction, as indicated by the arrow 16. For purposes of illustration, a floor having four-phase operation is described, meaning that the floor has associated with it four hydraulic cylinders (shown as A, B, C and D in FIG. 2) for driving four groups of slats. However, it will be appreciated as this description proceeds that the concept will function equally well for practically any number of cylinders. Each of the four cylinders is mechanically coupled to a group of slats, and there are many more slats than cylinders. This helps to distribute the load and its friction uniformly between the cylinders. The slats are further distributed by "interlacing" them for additional load distribution. With interlacing, if any four adjacent slats are considered, each of the four is connected to a separate cylinder. When the hydraulic subsystem, to be described, is operating to move a load across the floor, then three of every four slats are always moving toward the rear of the trailer 10, and the load will be dumped continuously from the rear of the trailer at the speed of the moving slats.

Figure 2:
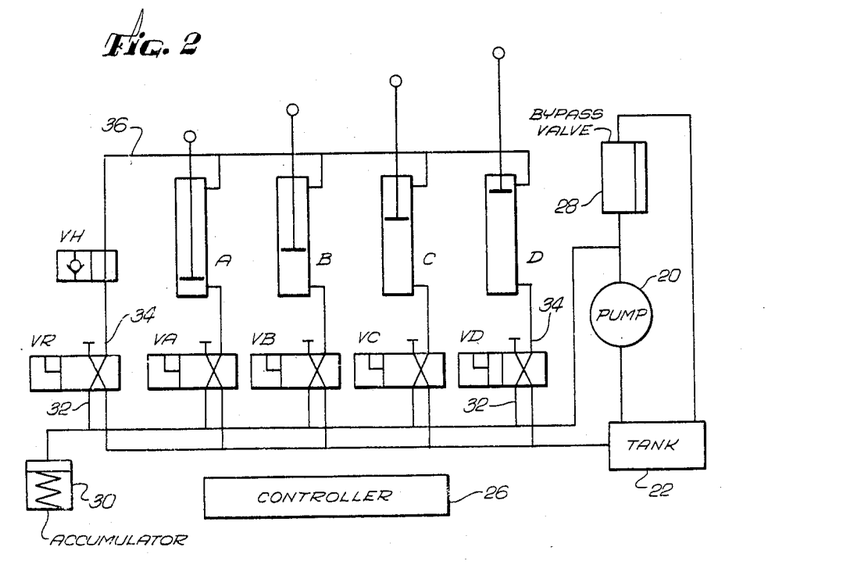
FIG. 2 is a schematic diagram of the hydraulic subsystem in the invention.

FIG. 2 is a schematic diagram of the hydraulic subsystem of the invention, and is shown as including a pump 20, hydraulic fluid tank 22, a bypass valve 28, six control valves, designated VA, VB, VC, VD, VR and VH, and an electronic controller 26. Control lines from the controller 26 have been omitted for clarity. The controller 26 turns on the pump 20 and switches the valves at the appropriate times for proper operation of the system. There is also a bypass valve 28, which is used for a short period on start-up and shutdown, but is otherwise not used except as a safety feature in the event of a failure. An optional accumulator 30 is used to reduce hydraulic spikes in the system when the valves are switching. As will be described later, the controller timing will delay the operation of any valve that would interrupt smooth flow of the fluid until the appropriate alternate valve has had time to switch. This delay is on the order of 50 ms, the response time of the valve, and is, in any event, not critical to proper operation of the apparatus.

As shown in FIG. 2, hydraulic fluid may be drawn from the tank 22 by the pump 20. The high-pressure side of the pump 20 communicates with one port 32 of each of the valves VA, VB, VC and VD, and to the valve VR. In one position of each of these valves, this port 32 is connected by the valve to an outlet port 34 connected either to one side of the appropriate cylinder A, B, C, D, or, in the case of valve VR, to the valve VH. Each of the cylinders, A, B, C, D is connected on its other side to a return line 36, which is in turn connected to the hold valve VH. Basically the hold valve VH is a shut-off valve, which in one position permits the flow of fluid in either direction, but in the other direction prevents the flow of fluid from the return line 36 back through the return valve VR. The valve VR is a two-position valve permitting the return line 36 to be connected either to the pump 20 or to the tank 22. Likewise, each cylinder valve VA, VB, VC, VD is a two-position valve permitting the corresponding cylinder to be connected to the pump or to the tank.

Valves VR, VA, VB, VC, and VD can take the form of any valve that can switch between pump flow to the cylinder and return flow from the cylinder. A 2-way/3-port valve would be appropriate, and a 2-way/4-port implementation is shown in the drawing. In the position shown, each valve VA, VB, VC, VD is connecting the corresponding cylinder to the pump 20, and the return valve VR is shown as connecting the return line 36 to the pump 20. The hold valve VH is a poppet type ON/-OFF valve, and is included in the system because of its characteristically very small leakage. As will be described, during operation the fluid on the return sides of the cylinders is trapped in line 36 and must not leak out. The valve used for VR is a spool valve, which has considerably more leakage than a poppet valve. However, if valve VR has small enough leakage, then valve VH could be eliminated from the configuration shown.

Figure 3:
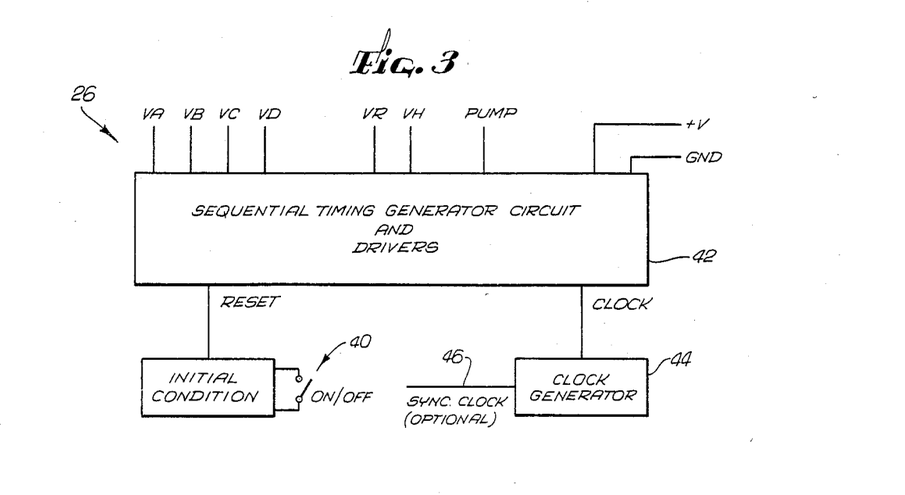
FIG. 3 is a simplified block diagram of the controller employed in the system of the invention.

FIG. 3 is a block diagram of the controller 26 is shown. The controller includes an ON/OFF switch 40 to start and stop the system, a timing signal generator circuit 42 to generate the desired timing signals for operation of the valves and the pump, and a clock generator 44 to provide the required clock frequency for proper operation of the timing generator. The timing signal generator circuit 42 is of conventional design and generates valve on/off signals in accordance with a predetermined sequence, to be described with reference to FIG. 4, and regulated by signls from the clock generator 44.

Each output from the circuit 42 controls the associated valves and pump as shown in FIG. 2. An optional synchronization clock supplies signals to the clock generator 44, as indicated at 46, and is described later with reference to FIG. 5. If the pump 20 has a sufficiently constant flow rate, the timing of the clock signals supplied to the circuit 42 can be can be assumed to be fixed for proper operation. As will be described later, however, it is desirable to synchronize the generation of clock signals with operation of the hydraulic subsystem. Each output signal to the valves is a two-state signal, either energizing a solenoid contained in the valve to switch it to one of its positions, or not energizing the solenoid, so that the valve remains in its de-energized state. For this description, the valves shown in FIG. 2 are in their de-energized states. The pump signal will function similarly to the valve signals, except that the signal will energize a solenoid that either applies electricity to the pump (if electric), or engages a valve that directs fluid flow to the system from a pump that is already running (such as on a tractor engine that has already been running), or engages an electric clutch on an engine driven pump.

Figure 4:
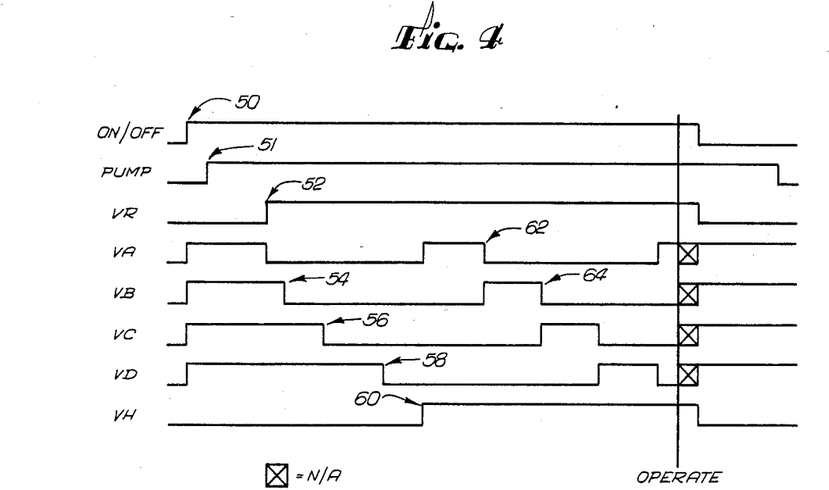
FIG. 4 is a valve timing diagram illustrating operation of the invention.

Operation of the system of the invention can best be understood be referring to the timing diagram shown in FIG. 4, which shows a sequence of valve and pump control signals provided by the controller to obtain proper operation of the system. The OPERATE line drawn vertically from the time axis of the diagram implies that the sequence of signals is continuous from that time on, and repeats as shown in the previous twelve time increments that make up a complete cycle. In other words the twelve-increment time cycle repeats itself following a start-up sequence of twelve time increments following a power-on signal, and continues until shutdown. Each signal, when shown as high, indicates that the appropriate valve should be energized and would therefore take the state opposite of that shown in FIG. 2. A low signal indicates that the valve is not energized and is in the state shown in FIG. 2. For the purposes of this description, each time increment can be assumed to be 1 second. Therefore, each cylinder will move through its full travel displacement in 9 seconds. If the stroke is 9 inches, the slats (and the load) will move at 1 inch/second (ips). A speed of 3 ips would be achieved if each time increment were ⅓ second. This would permit the unloading of a 40-foot trailer in about 2 minutes 40 seconds.

Initially, all of the cylinders A–D are in their fully retracted states when the system is turned ON. This is accomplished during a shutdown sequence that will be described later. The description that follows refers to the timing sequence of FIG. 4, and applies to the appropriate signals and valves in FIGS. 2 and 3. When the system is turned ON, all of the valves go to the states shown at time $t_0$ in FIG. 4. The return valve VR and the hold valve VH are deenergized, that is to say the return line 36 is connected to the pump 20 to allow fluid flow through these valves to the return sides of the cylinders. The cylinder control valves VA–VD are in the state not shown in FIG. 2, connecting the respective valves to return fluid to the tank 22. When the power is turned ON, as indicated at 50, and the pump is turned on, as indicated at 51, fluid flow will be through VR and VH for a short time, to insure that the cylinders are all fully retracted.

In the next step, indicated at 52, the return valve VR is switched to the tank 22 and the valve VA is switched to the pump 20 so that the cylinder A now starts to move forward, the fluid on its other side being pushed back to the tank through the valves VH and VR. Since the pump 20 provides a relatively constant flow, the one cylinder to which flow is now connected will move three times faster than when three cylinders are all moving together. The second cylinder B is started when the first cylinder A has traveled ⅓ of its desired stroke. Therefore, valve VB is switched to the pump flow after only one second, as shown at 54.

The selection of this one-second interval will be apparent from the following discussion. When all three cylinders are moved together, they will each move at 1 ips and, for a 9-inch stroke, they will have traveled ⅓ of the full stroke in 3 seconds. When the A cylinder alone is being moved, its speed will be three times as fast, or 3 ips, and it will travel ⅓ of the stroke length in 1 second. Similarly, when only the A and B cylinders are moving, the two cylinders will have a speed of 3/2 of the speed at which all three would travel together, i.e. at 1.5 ips. Therefore, after two seconds at this speed the A and B cylinders will have moved a distance of 3 inches, or ⅓ of the stroke length, so that cylinder A will have moved a total distance of ⅔ of the stroke length. At this instant in time, valve VC is switched to the pump, as shown in at 56. Now all three cylinders are moving at the desired speed of 1 ips. In three more seconds the A cylinder will be at its fullest desired extension, the B cylinder at ⅔, the C cylinder at ⅓ and the D cylinder at its starting position. At this time, valve VD is switched to the pump, as indicated at 58, and all four cylinders are allowed to move for a short time (about 10% of their full stroke). This additional movement of all of the cylinders ensures that a full return stroke will not take the cylinders all the way to a fully retracted position. Without this margin, a cylinder might tend to "bottom out" on its return stroke, perhaps because of the expansion of heated hydraulic fluid.

At this point, indicated at 60, the cylinders are all properly staggered, with some space for tolerances built-in at both ends of their strokes. The operating stroke of 9 inches assumes a physical stroke capability of about 12 inches. At this time, the hold valve VH is closed, locking the fluid in return line 36 and all of the returns of the cylinders, and simultaneously valve VA is switched to the tank 22. Since the trapped fluid is being pushed by cylinders B–D, the fluid will push cylinder A in the return direction at three times the speed of the others, since they are displacing three times the fluid that is entering the cylinder A return. In a predetermined time period of three seconds, the B cylinder will now have moved to full extension, the C cylinder to ⅔, the D cylinder to ⅓ and the A cylinder will have returned back to its starting position. Valve VA is then switched back to the pump and valve VB is switched to the tank, as indicated at 62, resulting in a repeat of the cycle, with the B cylinder now returning at three times the forward speed. Three seconds later, at 64, the B cylinder has returned to its retracted position and the C cylinder begins its return stroke, and after three further seconds the D cylinder begins its return stroke.

This process is then continued until the system is turned OFF. The cylinders remain synchronized and within the desired stroke range of the cylinders, employing the absolute control of the trapped fluid. Note here that, although not shown in FIG. 4, the electronics will switch one valve to the tank about 50 ms before switching another valve to the pump. This will ensure that the trapped fluid will always have a flow path through a valve connected to the tank, thus preventing pressure spikes and any bypassing of oil from the supply. When the ON/OFF switched is turned OFF, all of the valves are switched to the same state that was set when the system was switched ON, and the pump is kept running for a period of time sufficient to return all of the cylinders back to their fully retracted states. Power is then shut off automatically and the system is completely in an OFF condition.

FIGS. 5a–5d show four alternative synchronization approaches for the generation of clock signals. If the pump flow rate is reasonably stable, then a simple accurate oscillator at the proper frequency will suffice, and the system would operate as described above. If, however, the flow rate varies too much, an alternate means for adjusting the timing can be utilized. The need for this alternate timing may result because the distance that the cylinders travel is determined by the time that the pump flow is allowed into the cylinder. If the pump speeds up the flow for some reason during a stroke, the cylinder will travel too far unless the timing circuits shorten the ON period of the valve a proportionate amount. The timing circuits are synchronized to a master clock signal, and if this signal can be adjusted in proportion to the fluid flow rate, the system will remain synchronized.

Figure 5A:
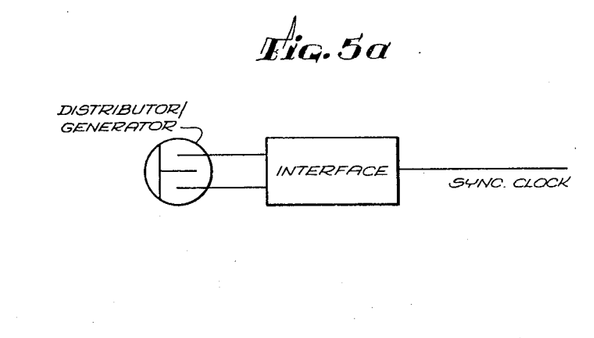
FIG. 5a–5d are block diagrams depicting four alternative synchronization approaches for the generation of a master clock signal.
Figure 5B:
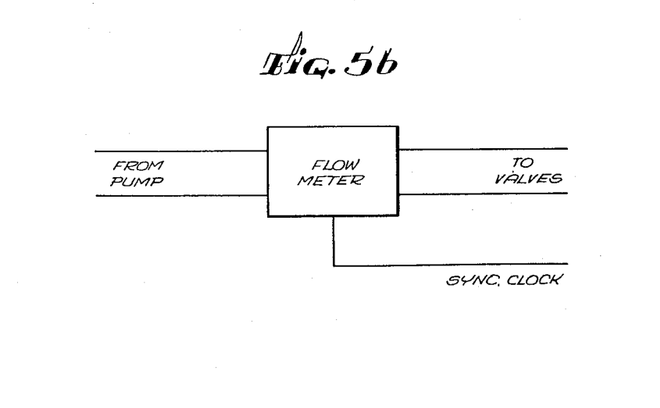

FIG. 5(a) shows how an engine tachometer could be used if the pump 20 is powered by a vehicle engine, and its flow is proportional to its driven speed, which is usually the case. FIG. 5(b) shows how a flow meter could be used to generate a clock frequency proportional to the flow rate. A number of digital flow meters are commercially available for this purpose, providing a clock signal at a rate that is proportional to the flow rate.

Figure 5C:
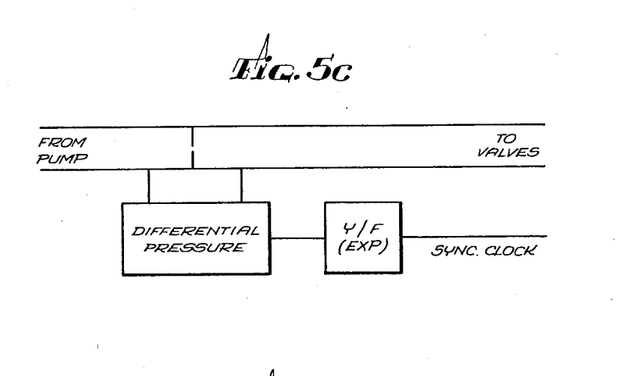

FIG. 5(c) shows how the pressure drop across an orifice in the pump line could generate a clock frequency proportional to the flow rate. The pressure drop is proportional to the square of the flow rate through the orifice. Therefore, an exponentially weighted (square-root) voltage-to-frequency converter provides the desired output clock that is directly proportional to the flow rate.

Figure 5D:
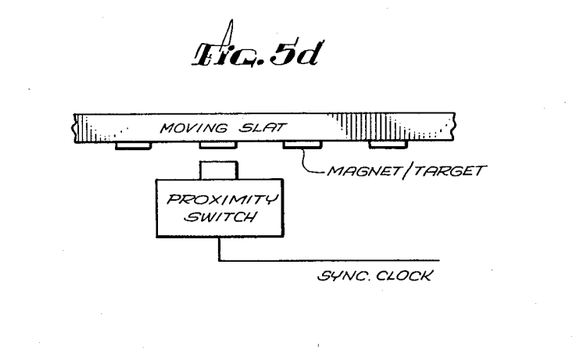

FIG. 5(d) shows how timing synchronization could be effected by use of a proximity sensor monitoring one of the movable slats. From FIG. 4 it can be seen that the appropriate switching times of the valves could be derived by dividing the stroke of one of the slats into four equal lengths and monitoring these positions. As each position is reached, the appropriate switching would be implemented. The start-up and shut-down would function as shown in FIG. 4, but the switching cycles would be determined by the state of the position sensor, rather than by a timer.

Figure 4A:
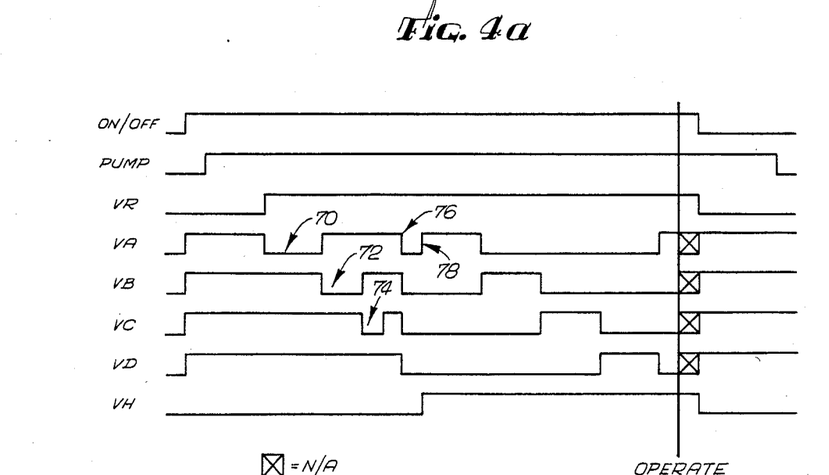
FIG. 4a is a valve timing diagram similar to FIG. 4, but showing an alternate approach for initializing cylinder positions.

FIG. 4a shows an alternate approach to the start-up sequence described above with reference to FIG. 4. The overall system operation depends on the fact that the load on the floor tends to be distributed uniformly over the multiple slats making up the floor, such that the forces required for operating the four cylinders are practically equal. Furthermore, the slats that are all moving in the same direction are effectively locked together by the distributed load and therefore all move at roughly the same speed. In order to ensure that the slats are initially moved to the correct point upon start-up, and that the entire load is started at the same time and by all of the forward moving cylinders, the alternate timing diagram in FIG. 4a has been provided.

The start-up sequence begins with the return of all the cylinders to their fully retracted states, as in the sequence described earlier. The next step is to move the A cylinder (only) for the correct period of time, with all of the pump flow going only to that cylinder so that its desired starting position is assured, that is, extended to its maximum length. This is indicated at 70. Next the B cylinder (only) is moved for an appropriate time period to extend that cylinder to $\frac{2}{3}$ of its maximum length, as indicated at 72. Next the C cylinder (only) is moved for an appropriate time period to extend that cylinder to $\frac{1}{3}$ of its maximum length, as indicated at 74. Now, after a slight delay during which there is no movement, all of the cylinders are started simultaneously, as indicated at 76, which will initiate movement of the load and lock the cylinders together with the load movement. Finally, after all of the cylinders have moved a slight distance, the A cylinder is reversed, as indicated at 78, and the hold valve closed to allow the the A cylinder to be returned by the action of the other three cylinders. Cyclic operation of the cylinders then proceeds as previously described, to move the load continuously in the desired direction.

Figure 4B:
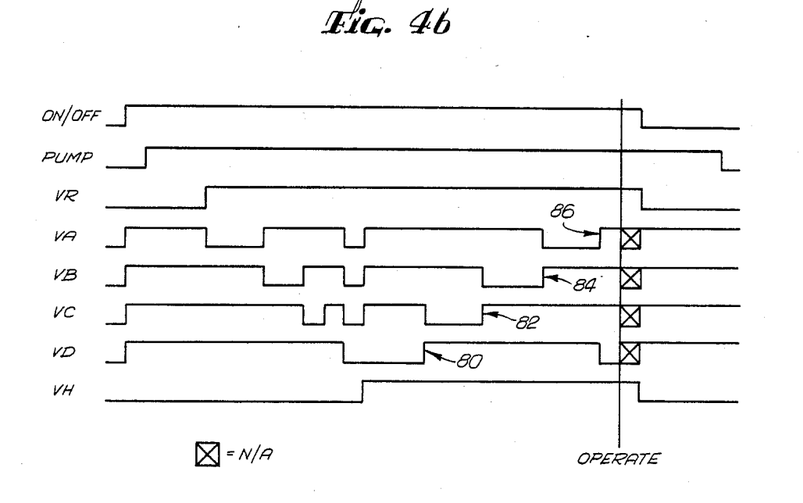
FIG. 4b is a valve timing diagram similar to FIG. 4a, but showing how the apparatus can produce reverse movement of a load.

In accordance with another aspect of the invention, the movable floor can be operated in a reverse direction. FIG. 4b shows an appropriate timing modification that will allow the floor to move the load in the reverse direction, for loading of the trailer. The timing for for the start-up sequence is the same as for foward operation already described with reference to FIG. 4a. However, the subsequent cyclic operation of the cylinders is reversed and inverted. That is to say, one cylinder receives pump flow, moving three times as fast as the other three, pushing the other three in the reverse direction. The start-up sequence places the A cylinder furthest forward and the D cylinder is furthest back. Therefore the D cylinder is pushed first, as indicated at 80, next the C cylinder, as indicated at 82, next the B cylinder as indicated at 84, and finally the A cylinder as indicated at 86. This exactly reverses the sequencing of the cylinders, and the load will be moved in a reverse direction.

The power and pressures required from the pump operating in this reverse mode are nearly identical to those required for the forward mode of operation, since the same mechanical work is being done. In the forward sequence, the pump flow is divided into three cylinders at the required pressure and the work is therefore divided three ways between the three cylinders. In the reverse sequence, the pump flow is directed into only the one cylinder at the same required pressure but at three times the flow rate. Therefore, the mechanical work is the same for the two modes of operation.

Figure 6:
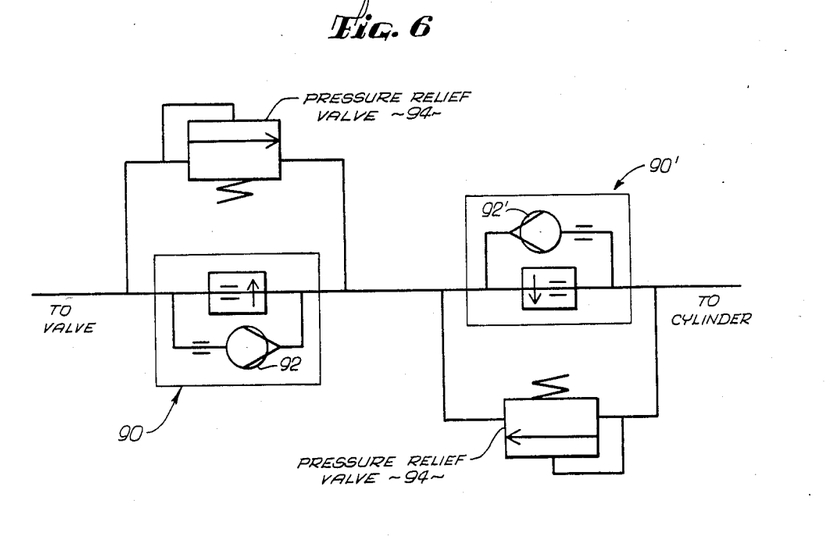
FIG. 6 is a simplified schematic diagram illustrating the use of constant flow valves for equalizing flow distribution among simultaneously selected valves.

FIG. 6 shows how a set of constant flow valves can be incorporated into the system to ensure that each cylinder is moving at the same speed in the group of cylinders all moving in the same direction. If the loads and the required pressures are not equal for all cylinders moving in the same direction, the cylinder with the lowest load will move faster than the others. If the difference in speed is small, then flow control valves would not be required. However, if the speed difference is too severe, then the addition of constant flow valves will eliminate the problem.

In accordance with this aspect of the invention, a constant flow valve, as illustrated at 90, is added between each of the control valves and cylinders, and is set to regulate the flow to ⅓ of the pump flow. Each constant flow valve 90 has associated with it a parallel-connected one-way valve 92, which permits free flow through in a reverse direction. The constant flow valve is basically a unidirectional device and, for the reputation of flow in both directions, as required for forward and reverse modes of operation of the floor, a second constant flow valve 90′ is connected in series with the first, along with its parallel-connected one-way valve 92′. Only one of the constant flow valves 90, 90′ is active at any time, depending on the direction of flow, and the other one is bypassed by its associated one-way valve 92, 92′.

In operation of the movable floor using the flow control valves, the same flow will be forced into each of the three selected cylinders and they will all move at the same speed. This is because the cylinder requiring the least pressure will have its flow control valve limit the flow to ⅓ of the total flow and then raise the pressure at the supply until the other cylinders have enough pressure drop across their flow control valves to limit their flows to ⅓ each and subsequently force the other cylinders to the same speed as the first. If the flow from the pump is less than the total of the flow control valves, the cylinder requiring the greatest pressure will not have a full ⅓ of the remaining flow and will therefore move slower, but only by the amount of the flow difference from the pump.

If the flow from the pump exceeds the total flow control valve settings, then the excess flow would be dumped through the safety bypass valve 24 (FIG. 2), causing significant loss of power. However, if a pressure relief valve 94, 94′ is placed across each flow control valve 90, 90′ and set for a pressure blow-off at the maximum pressure difference expected between the cylinders (about 200 psi), then the excess pump flow will be bypassed to the cylinder requiring the lowest pressure, moving it faster, but only by the amount of the excess flow from the pump. This will prevent the loss of power across the pump bypass and all of the available pump power will be employed to do useful work. In both cases, that is whether the pump flow is greater or less than the total flow control valve settings, the unbalanced flows will tend to equally distribute themselves among the other cylinders and keep their speeds relatively equal. When the differential flows go to the unbalanced cylinders, the pressure drops across the valves will change the supply pressures, allowing some of the unbalanced flow to be diverted to the other cylinders.

As mentioned earlier, this technique of flow balancing can also be implemented for reverse flow by including two series-connected constant flow valves and one-way valves for each cylinder, as shown in FIG. 6. The second set of constant flow valves is required only for reverse operation described above, and is not needed if reverse operation is not required.

Figure 2A:
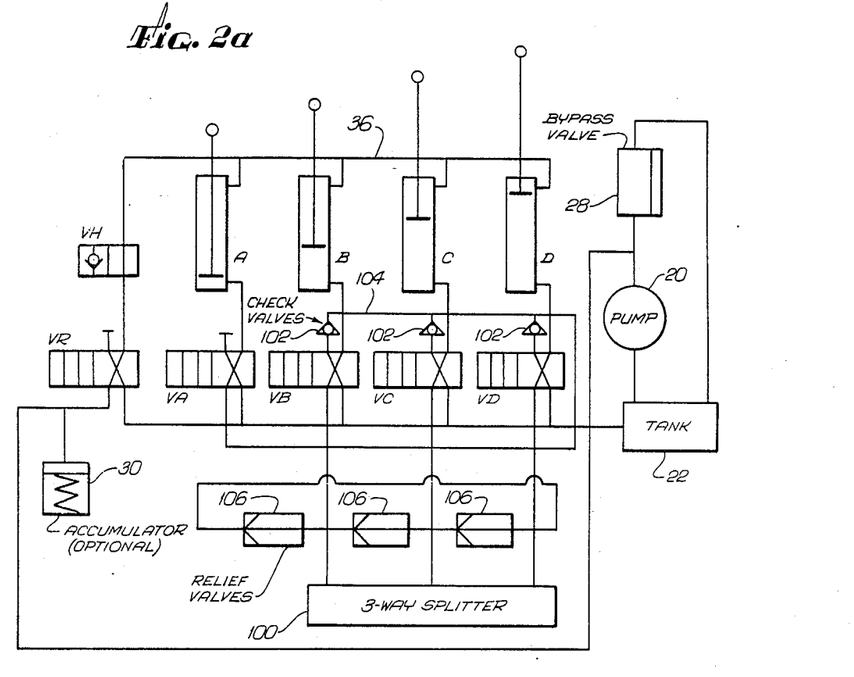
FIG. 2a is a schematic diagram similar to FIG. 2, but including a flow splitter for improved uniformity of flow distribution.

Other techniques for balancing the flow could also be used within the scope of the present invention. For example, another approach is to included a three-way flow divider connected between the pump and the four cylinders, with a special combination of valves that, under proper control, would always direct the three controlled flows to the three cylinders selected to move forward together. FIG. 2a shows a modified system block diagram that incorporates a flow divider or splitter 100 in order to insure that the three forward-moving cylinders are all moved at approximately the same speed, independent of their loading condition.

Flow from the pump 20 is split equally into three flows by the splitter 100, each of the three flows being directedto one port of each of three of the four 4-way valves. The three divided flows are shown as being connected to valves VB, VC and VD, respectively. Since, after start-up, there are always three cylinders moving forward there are always three flow paths for the splitter 100 output. In order to control which subset of three cylinders receives the flow and which is to make a return stroke, the system is connected as shown in FIG. 2a. When cylinders B, C, and D are moving forward, the three flows are connected appropriately and the A cylinder is making a return stroke. When any one of the cylinders B, C, or D is switched to return flow to the tank, the corresponding splitter output is directed through that cylinder's solenoid valve and a chekc valve 102 and into a common line 104 connected to the flow input of the A cylinder solenoid valve VA.

It will be noted that the valves VB, VC and VD in FIG. 2a employ all four of their ports. The two ports on the lower side (in the drawing) are connected to the pump and to the tank, respectively, and one port on the upper side of the valve is connected to corresponding cylinder. The fourth port of these three valves is connected to one of the check valves 102, which permits flow only out of the four-port valve and into the line 104. Thus, if one of the three valves VB, VC, VD, such as VB, is switched from the position shown in FIG. 2a, such that the ports are connected in a "straight-through" configuration instead of the "criss-cross" configuration shown, then a high-pressure line from the splitter 100 will be connected to the common line 104 through valve VB and check valve 102, and thence to the valve VA. Valve VA will, therefore, drive cylinder A in a forward direction with cylinders C and D. Cylinder B will make a return stroke, in the same described with reference to FIG. 2. Reversal of cylinders C and D is accomplished in a similar manner.

Since the A cylinder is driven forward whenever one of the other cylinders is returning, and only one of the others is returning at a time, the system will automatically work as intended and the three splitter outputs will always be directed to the selected subset of three cylinders. The check valves on the outputs of the valves VB, VC, VD prevent flow from returning to the tank through any of the other valves that are directing flow to their respective cylinders.

The system shown in FIG. 2a also includes three relief valves 106 connected between the outputs of the splitter 100 to prevent the pump 20 from bypassing when a cylinder reaches its maximum extension. Since at least one cylinder will be moving forward faster than the others, due to unavoidable differences in splitter outputs, the fastest cylinder will bottom out on its forward stroke. The action of the splitter 100 is such that, when one flow output stops, all of the outputs stop. In accordance with this aspect of the invention, when one cylinder stops at its full extension, the fluid flow that the stopped cylinder was receiving will be automatically diverted to one or more of the other cylinders. This approach solves two problems. First, the pump 20 does not have to be bypassed, and second, the returning cylinder still receives enough fluid for a full return stroke, since displacement occurs in one or more of the other forward moving cylinders. The relief valves are set to pass fluid at a relatively low pressure, to permit operation of the relief valves when one of the cylinders bottoms out, but one that is sufficiently high to prevent diversion of flow in normal operation, with all three selected cylinders moving forward.

Figure 4C:
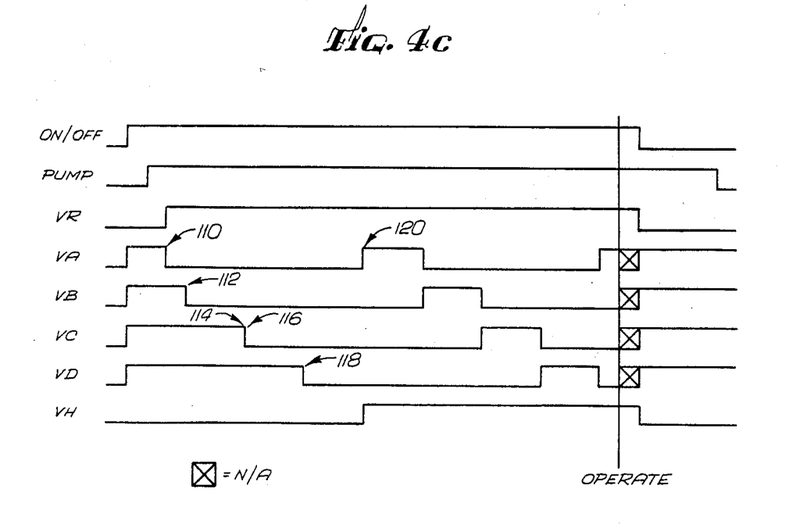

FIG. 4c illustrates the start-up and sequential timing of valves connected as in FIG. 2a. Start-up is similar to the previously described approaches in the initial and ending return of the cylinders to full retraction. However, to correctly stage the cylinders to their initial positions, the A cylinder is first connected to the flow, as indicated at 110. Since the others are initially switched to return flow, all three splitter outputs are at this stage flowing to the A valve, which is therefore moving three times faster than normal. After only one time increment, the B valve is switched to flow, as shown at 112. At this time, the distance moved by the A cylinder is designated as x, for purposes of analysis of the cylinder positions. The B cylinder will now get one third of the flow while the A cylinder gets two-thirds of the flow. Now both the A and B cylinders are allowed to move for three time increments, after which, at point 114, the B cylinder will have moved out a distance of x and the A cylinder an additional distance of 2x. Next, at point 116, the C cylinder starts to move and all three cylinders (A,B,C) receive one third of the flow. In the next three time increments, the cylinders A, B and C will all have moved an additional distance x. Finally, at point 118, the D cylinder starts to move and the cylinders B,C, and D each receive one third of the flow. The A cylinder is now receiving no flow and is not moving. In the next three time increments, from point 118 to point 120, the cylinders B,C, and D will have moved an additional increment of x. At this point 120, the accumulated displacements of the cylinders will be 4x, 3x, 2x and x for the A, B, C and D cylinders, respectively. The cylinders are therefore in position for sequential operation, which proceeds as in the previously described sequential timing diagram.

As mentioned previously, instead of having fixed timing and a constant flow pump, or variable timing control by monitoring the pump flow, a set of physical switches can instead by connected to one of the cylinders, in order to determine the appropriate valve switching times independently of the pump flow rate. This can be accomplished in many ways, but two possibilities are described below with reference to FIG. 7.

Figure 7:
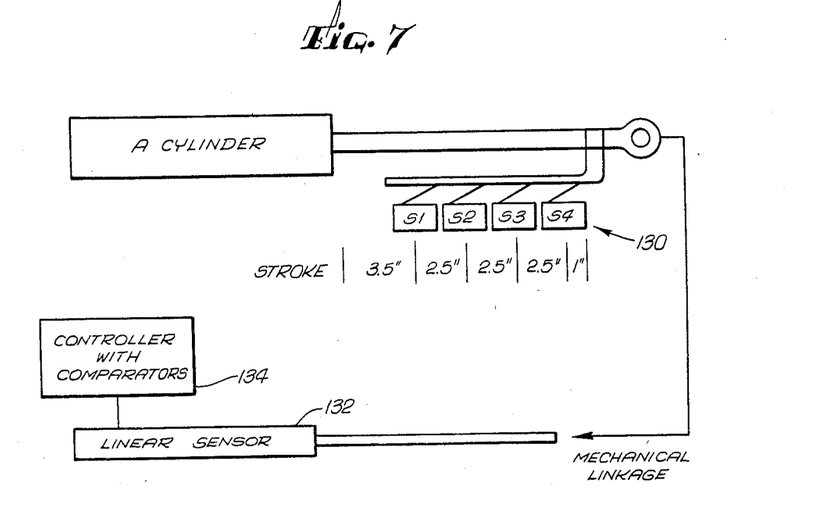
FIG. 7 is a schematic diagram illustrating the use of a cylinder position sensor for synchronization of the apparatus.

As shown in FIG. 7, the system timing can be generated by using position switches connected to monitor movement of the A cylinder. It will be apparent that all of the valves are switched at times that correspond to the position of the A cylinder. For example, when the A cylinder is returning, the other three cylinders are moving forward. When the A cylinder gets back to its starting point, it must start forward and the B cylinder must start its return stroke. In one third of the A cylinder's forward travel, the B cylinder will have returned to its starting position and the C cylinder will hve reached its maximum position, so the B cylinder is started forward and the C cylinder is started on its return stroke. This basic sequence is then continued cyclically in normal operation. It should now be apparent that if there are four switches 130 positioned along the A cylinder's stroke to identify the required four positions at x, 2x, 3x, and 4x as described above, then the correct operation can be obtained.

FIG. 7 shows two ways to identify the A cylinder's position at these four points. The first approach is the straight forward use of "microswitches" 130 placed at the appropriate positions. The second approach is to use a linear position sensor 132 connected to a controller 134 that includes electronic comparators (not shown) calibrated to provide the appropriate signals when the analog output of the position sensor reaches the appropriate position. Details of this approach will be apparent to one of ordinary skill in electromechanical circuit design. All that is required is to be able to stage the cylinders correctly and then sequence the valves accordingly. One way of achieving these goals is described in the following paragraphs.

Figure 4D:
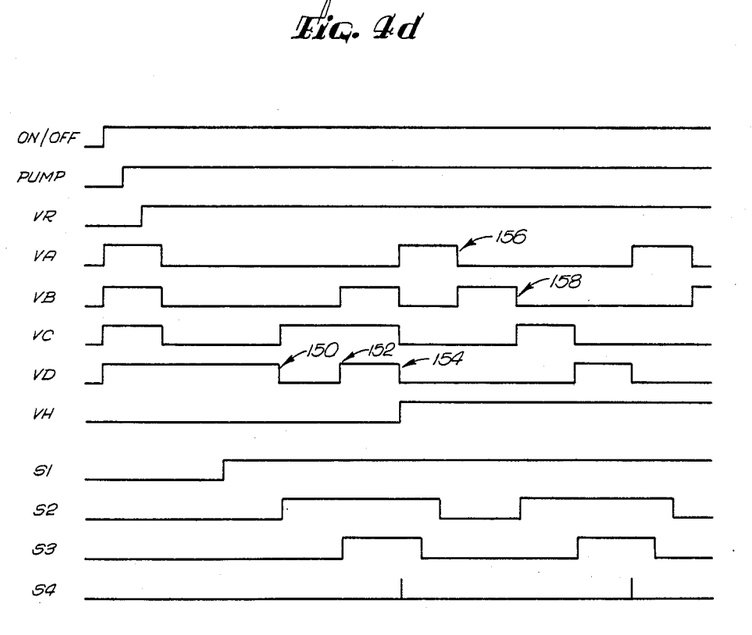
FIG. 4d is a valve timing diagram similar to FIG. 4c, but showing operation timed by switches actuated with movement of one of the cylinders.

As shown in FIG. 4d, the required start-up and operating sequential timing is similar to the previous approaches in the initial and ending return of the cylinders to full retraction, using fixed time delays. However, the use of switches at the end of each cylinder's stroke could also be used to signal when all of the cylinders are retracted fully (not shown). To correctly stage the cylinders to their initial positions, the cylinders A,B, and C are all initially connected to the flow. At this time all three splitter outputs are flowing equally to the A,B and C cylinders. All three now move until the switch S2 on the A cylinder is triggered. At this point, indicated at 150, the cylinders A,B, and C have moved out a distance 2x. Now the D cylinder is switched to flow and the C cylinder switched to return and the cylinders A,B, and D are allowed to move until switch S3 is triggered, at 152, at which point the cylinders A,B, and D have each moved out an additional distance of x. Now the cylinders B,C, and D are switched to return and stop moving while the A cylinder receives all of the flow, moving three times as fast, and the A cylinder then moves until switch S4 is triggered, at 154, at which time the A cylinder has moved an additional distance x. At this point, accumulated displacements of the respective cylinders will be: 4x, 3x, 2x and x, for the A, B, C and D cylinders. This places the cylinders at the desired staging positions for sequential operation, which proceeds as follows:

When the A cylinder has first triggered the switch S4, at 154, the A cylinder is switched to return, the other cylinders switched to flow and the hold valve VH closed so that the cylinders B,C, and D are moving forward together and the combined flow from these three cylinders is driving the A cylinder in a return stroke of its normal operation. As the A cylinder reverses its path, the switches upon its return are ignored until it reaches the switch S1. At this time, indicated at 156, the A cylinder is switched to the pump and the B cylinder is switched to the return. When the A cylinder triggers the switch S2, indicated at 158, the B cylinder is switched to the pump and the C cylinder is switched to the return. This operation then continues sequentially as described above.

It will be appreciated from the foregoing that the present invention represents a significant advance in the field of movable floors. In particular, the invention provides a floor that can move a supported load in a substantially continuous fashion. It will also be appreciated that, although the presently preferred embodiments of the invention have been described in detail for purposes of illustration, various modifications may be made without departing from the spirit and scope of the invention. Accordingly, the invention is not to be limited except as by the appended claims.

We claim:

1. A system for moving a load supported by a floor, comprising:
   a plurality of elongated floor slats movable in a direction parallel to the slats; and
   means for moving the slats in a reciprocating manner such that, at any instant during operation of the system, a majority of the slats are moving in a desired direction at a predetermined speed, and a minority of the slats are moving in the opposite direction at a higher speed, whereby, the load supported by the floor will tend to move in the direction of the majority of slower moving slats;
   and wherein
   the slats are arranged in a plurality (N) of groups, which are interlaced such that no group contains adjacent slats;
   the means for moving the slats includes a plurality (N) of individually controllable actuators for controlling the movement of each of the groups;
   (N−1) of the groups of slats are moved in the desired direction at the same time, while the remaining one of the groups is moved in the reverse direction at (N−1) times the speed of the (N−1) majority of the groups;
   as each group moving in the desired direction reaches the end of its travel in that direction, it is selected as the group to be moved in the reverse direction;
   each of the individually controllable actuators includes a hydraulic cylinder and an associated valve; and
   the means for moving the slats also includes means for controlling the valves in a sequence such that, at any time, fluid from (N−1) cylinders moving the (N'1) groups in the desired direction is communicated with the one remaining cylinder to move one group of slats in the reverse direction.

2. A system as defined in claim 1, wherein the means for moving the slats includes:
   means for controlling the speed of movement of the slats in relation to fluid flow rate within the system.

3. A system as defined in claim 2, wherein the means for controlling the speed of movement of the slats includes:
   means coupled to a fluid pump, for generating timing signals.

4. A system as defined in claim 2, wherein the means for controlling the speed of movement of the slats includes:
   a fluid flow meter for generating timing signals.

5. A system as defined in claim 2, wherein the means for controlling the speed of movement of the slats includes:
   differential pressure measurement means for generating timing signals.

6. A system as defined in claim 2, wherein the means for controlling the speed of movement of the slats includes:
   means for sensing the position of one of the slats, and thereby generating timing signals based on slat position.

7. Moving floor apparatus, for moving a load in a desired direction across the floor on which it is supported, the apparatus comprising:
   a plurality of elongated floor slats, mounted for sliding and reciprocating movement in a direction parallel to the slats;
   a smaller plurality (N) of hydraulic cylinders each coupled to a group of the slats, to move the group of slats together in either direction, wherein each group contains an approximately equal number of non-adjacent slats;
   a hydraulic system having a high-pressure line and a low-pressure line;
   a plurality (N) of cylinder control valves, one associated with each cylinder, each valve having a first position in which a first end of the cylinder is connected to the high-pressure line and a second position in which the same end of the cylinder is connected to the low-pressure line;
   a return line communicating with the second end of each of the cylinders and connectable to the hydraulic system; and
   control means for switching the cylinder valves in such a manner that, at any instant during normal operation of the apparatus, a majority of the cylinders has high pressure applied to one end of each cylinder, to move a majority of the groups of slats in the desired direction in staggered positions, and a minority of the cylinders receives at the other end substantially all of the fluid flow from the majority of the cylinders, whereby the minority of the cylinders are activated at a higher speed than the majority, in the numerical ratio of majority to minority.

8. Moving floor apparatus as defined in claim 7, wherein:
   the majority of cylinders are (N−1) in number; and
   the minority of cylinders includes only one cylinder, which is moved in the reverse direction at (N−1) times the speed of the (N−1) cylinders moving in the desired direction.

9. Moving floor apparatus as defined in claim 8, wherein:
   the control means further includes means for placing the cylinders in initial positions staggered between two extremes of reciprocating motion.

10. Moving floor apparatus as defined in claim 8, wherein:
    the control means further includes means for synchronizing operation of the valves.

11. Moving floor apparatus as defined in claim 10, wherein the means for synchronizing operation of the valves includes:
    means for controlling the speed of movement of the slats in relation to fluid flow rate within the system.

12. Moving floor apparatus as defined in claim 10, wherein the means for synchronizing operation of the valves includes:
    means coupled to a fluid pump, for generating timing signals.

13. Moving floor apparatus as defined in claim 10, wherein the means for synchronizing operation of the valves includes:
    a fluid flow meter for generating timing signals.

14. Moving floor apparatus as defined in claim 10, wherein the means for synchronizing operation of the valves includes:
    differential pressure measurement means for generating timing signals.

15. Moving floor apparatus as defined in claim 10, wherein the means for synchronizing operation of the valves includes:

means for sensing the position of one of the cylinders, and thereby generating timing signals based on cylinder position.

16. Moving floor apparatus as defined in claim 15, wherein:

the means for sensing cylinder position includes a plurality of electrical switches positioned along the cylinder stroke.

17. Moving floor apparatus as defined in claim 15, wherein:

the means for sensing cylinder position includes a linear position sensor.

18. Moving floor apparatus as defined in claim 10, and further comprising:

means for equalizing the fluid flow to the selected majority of cylinders moving the load in the desired direction.

19. Moving floor apparatus as defined in claim 15, wherein:

the means for equalizing the fluid flow to the selected majority of the cylinders includes a constant flow valve positioned between each valve and its associated cylinder.

20. Moving floor apparatus, for moving a load in a desired direction across the floor on which it is supported, the apparatus comprising:

a plurality of elongated floor slats, mounted for sliding and reciprocating movement in a direction parallel to the slats;

a smaller plurality (N) of hydraulic cylinders each coupled to a group of the slats, to move the group of slats together in either direction, wherein each group contains an approximately equal number of non-adjacent slats;

a hydraulic system having a high-pressure line and a low-pressure line;

a flow splitter connected in the high-pressure line to divide the flow substantially equally to a majority of the cylinders;

a plurality (N) of cylinder control valves, one associated with each cylinder, each valve having a first position in which a first end of the cylinder is connected to the flow splitter and a second position in which the same end of the cylinder is connected to the low-pressure line;

a return line communicating with the second end of each of the cylinders and connectable to the hydraulic system; and control means for switching the cylinder valves in such a manner that, at any instant during normal operation of the apparatus, a majority of the cylinders has high pressure applied to one end of each cylinder, to move a majority of the groups of slats in the desired direction in staggered positions, and a minority of the cylinders receives at the other end substantially all of the fluid flow from the majority of the cylinders, whereby the minority of the cylinders are activated at a higher speed than the majority, in the numerical ratio of majority to minority.

21. Moving floor apparatus as defined in claim 20, wherein:

the majority of cylinders are (N−1) in number; and the minority of cylinders includes only one cylinder, which is moved in the reverse direction at (N−1) times the speed of the (N−1) cylinders moving in the desired direction.

22. Moving floor apparatus as defined in claim 21, wherein:

the flow splitter has (N−1) outputs connected to (N−1) of the cylinder control valves, whereby a control valve in the first position connects flow from the splitter to the corresponding cylinder;

the apparatus further includes a common fluid line connecting one output port of each of the (N−1) control valves toa port of the remaining cylinder control valve; and the common fluid line carries high-pressure fluid from any of thr (N−1) control valves in the second position to the remaining control valve and its cylinder;

whereby splitter output flow may be switched to any (N−1) selected cylinders.

23. Moving floor apparatus as defined in claim 22, wherein:

each of the (N−1) control valves to which the splitter outputs are connected includes a check valve between at its connection to the common fluid line, to prevent fluid flow from the common fluid line to the low-pressure line.

24. Moving floor apparatus as defined in claim 23, and further comprising:

a plurality of relief valves connected between output lines of the flow splitter, to distribute fluid flow equally to unobstructed output lines in the event that one of the output lines is obstructed when a corresponding cylinder reaches the end of its travel before the others.

* * * * *

UNITED STATES PATENT AND TRADEMARK OFFICE
CERTIFICATE OF CORRECTION

PATENT NO. : 4,793,468

DATED : 12/27/88

INVENTOR(S) : James M. Hamilton et al.

It is certified that error appears in the above-identified patent and that said Letters Patent is hereby corrected as shown below:

In the drawings, Sheet 2, Fig. 2a, the 3-way splitter 100 should be connected to the line immediately below from the pump 20.

Column 2, line 34, "gropu" should be --group--. Column 5, line 15 delete "can be" second occurrence. Column 8, line 29 delete "the" second occurrence. Column 8, line 38 delete "for" second occurrence. Column 10, line 12 "directedto" should be --directed to--. Column 10, line 26 "chekc" should be --check--. Column 11, line 64 "hve" should be --have--. Column 16, line 30 "toa" should be --to a--. Column 16, line 33 "thr" should be --the--.

Signed and Sealed this

Seventh Day of January, 1992

Attest:

HARRY F. MANBECK, JR.

*Attesting Officer*   *Commissioner of Patents and Trademarks*